G. S. TYLER.
SAW LEVELING AND STRETCHING MACHINE.
APPLICATION FILED FEB. 6, 1917.
1,228,990.
Patented June 5, 1917.
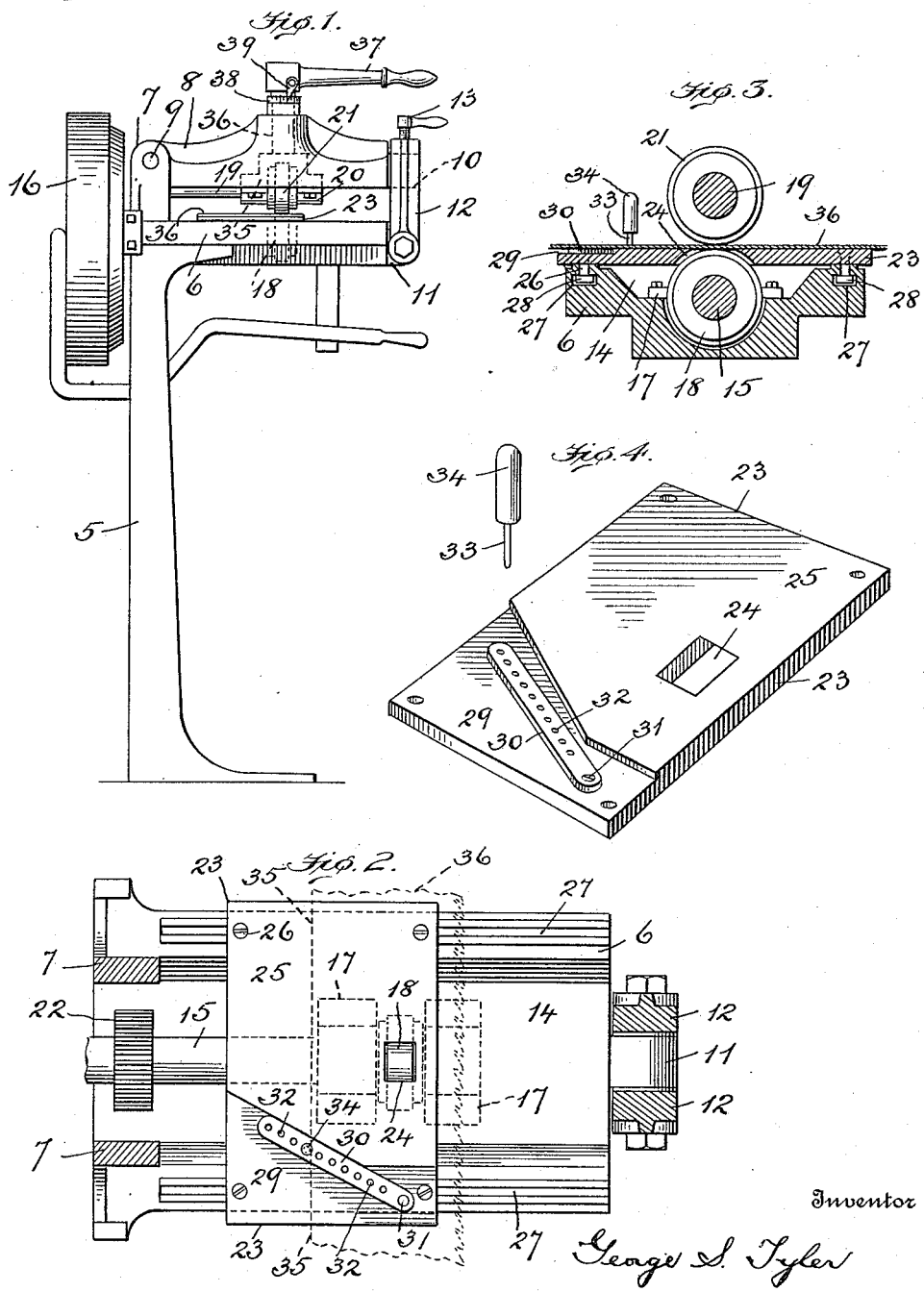
Inventor
George S. Tyler
By
Mann & Co.,
Attorneys.

UNITED STATES PATENT OFFICE.

GEORGE S. TYLER, OF BALTIMORE, MARYLAND, ASSIGNOR OF FORTY-NINE ONE-HUNDREDTHS TO GEORGE H. WELFEL, OF BALTIMORE, MARYLAND.

SAW LEVELING AND STRETCHING MACHINE.

1,228,990.  Specification of Letters Patent.  Patented June 5, 1917.

Application filed February 6, 1917. Serial No. 146,914.

*To all whom it may concern:*

Be it known that I, GEORGE S. TYLER, a citizen of the United States, residing at Baltimore city, in the State of Maryland, have invented certain new and useful Improvements in Saw Leveling and Stretching Machines, of which the following is a specification.

This invention relates to improvements in saw leveling and stretching machines and has particular reference to an attachment for machines of this character whereby to materially facilitate the guiding of the saw between the leveling and stretching rolls.

The present invention is especially designed for operation upon endless or band saws which in operation develop inequalities on their faces and also become concavo-convex so that frequent attention must be given such saws.

Machines are provided for the treatment of these saws and said machines employ rolls between which the saw is passed whereby to effect a smoothing out and a stretching of the band.

I have found, in actual practice, that to attain the best results, the operations of the rolls on the opposite faces of the band saw should take place in parallel lines,—that is, where the condition of the saw is such that a plurality of rolling and pressing operations, side-by-side are necessary to remove an imperfection, such operations, if made in parallel lines, or lines parallel to the edge of the saw will effect the best results.

My invention, therefore, has for its object to provide an improved device whereby to facilitate the guiding of the saw between the rolls so that all rolling operations on the blade may be made in lines parallel with the edges of the saw blade.

With the above objects in view, the invention is illustrated in the accompanying drawing, in which, Figure 1, shows a saw treating machine with the improved device in position thereon.

Fig. 2, illustrates the improved device in top plan and in place over the lower roll of the machine.

Fig. 3, shows on an enlarged scale a vertical section through the upper and lower rolls; the guide attachment between the rolls and the saw blade in place on the guide attachment and between the rolls, and Fig. 4, illustrates the improved device in perspective and detached from the machine.

In illustrating the invention I have selected a form of machine that is well-known to the trade, to which my improved device is shown attached, but it is to be understood that the particular form of mechanism for carrying and operating the rolls is immaterial.

In the drawing, the numeral 5, designates a vertical support or standard which sustains a horizontal base plate 6, which latter is provided at one side with vertical arms or brackets 7. A horizontal beam 8, has one end pivoted at 9, between said arms or brackets and is sustained in an elevated position above the base plate 6, so that the free end 10, of said beam may be swung up from or lowered toward the base plate, for a purpose which will presently be explained.

The outer edge of the base plate is provided with a perforated lug 11, to which a latch bar 12, is pivotally connected, so as to be swung up over the free end 10, of the beam, and a hand screw 13, is carried by said latch-bar in order to engage and press said beam-end downwardly.

The base plate is provided with a horizontal cavity 14, in its upper side and a lower roll shaft 15, extends horizontally through the cavity and is driven by a pulley 16, on its rear end. The forward end of this lower roll-shaft is sustained in bearings 17, which are located in the base-plate cavity, and a lower roll 18, is carried on said shaft between said bearings so as to be revolved in a vertical plane.

An upper shaft 19, extends horizontally along the lower portion of the beam 8, and is sustained by bearings 20, and this latter shaft carries a roll 21, between said bearings and directly over the lower roll 18. The inner end of this upper shaft 19, carries a gear (not shown) which meshes with and is driven by a gear 22, on the lower shaft so that the two rolls will be driven in a direction that will enable a saw to be drawn between them and be rolled on opposite sides simultaneously.

A gage-plate 23, is interposed between the lower and upper shafts 15 and 19, and said plate extends horizontally across the base-plate 6, and over the cavity 14, of the latter. This gage-plate is provided with a slot 24, which fits over and exposes the upper circumference of the lower roll 18, which latter is substantially flush with the top surface 25, of said gage-plate, as shown in Fig. 3, of the drawing.

The gage-plate is preferably secured to the base-plate by means of bolts 26, which enter guide slots 27, in said plate and engage nuts 28, therein.

At one side, the gage-plate 23, is provided with a depressed ledge 29, and a horizontal gage-bar 30, seats flat upon said depressed ledge and has one end pivoted at 31, to said ledge. This gage-bar is provided with a series of perforations 32, which are located therein between the pivoted and free ends thereof and the upper surface of this gage-bar is substantially flush with the top surface 25, of the gage-plate.

It is thus to be understood that while the gage-plate 23, is rigidly secured to the base plate, the gage-bar 30, is pivoted at one end so its free end may be swung in a horizontal plane over the depressed ledge 29.

In order to make the gage-bar effective I provide a gage-pin 33, of a size to snugly fit and enter either of the perforations 32, in the gage-bar, and for convenience in handling I provide the gage-pin with a handle 34.

The bearings 20, which sustain the upper roll shaft 19, are carried on a vertically-movable block 35, which latter is loosely attached to the lower end of a stem 36, that screws down through the beam 8,—an operating handle 37, being provided on the upper end of the stem 36, by which the latter may be conveniently turned. A micrometer gage 38, may be provided on the beam with which a pointer 39, on the handle device 37, can coöperate so that the stem may be turned with precision to adjust the upper roll 21, with respect to the lower roll 18.

In the operation of the device the latch bar 12, is swung down from the free end 10, of the beam and the latter may then be swung up by turning on the pivot 9. The endless band saw 36, will then be placed over and seated upon the upper surface of the gage plate 23,—the lower stretch of the band-saw extending beneath the base plate 6. The beam will then be swung down again and engaged by the latch bar leaving the band saw between the upper and lower rolls 21 and 18. Before bringing the upper roll 21, down against the upper surface of the band saw, the operator, by means of a straight edge, will locate the uneven spots and the sprung portions of the blade, preferably marking the same with chalk to indicate the spots he desires to compress or stretch by the pressure of the rolls. In some instances it is necessary to pass the same section of the band saw between the rolls a plurality of times in order to flatten out a bump or to effect a stretching of the band in a cross-wise direction, and these operations should be performed in lines parallel with the smooth side-edge of the blade. In order to do this, the operator, having determined where the rolling operation is to take place, will insert the gage-pin 33, in that hole of the gage-bar which will properly locate the edge of the blade with respect to the rolls so as to cause that portion of the blade which it is desired to roll to be located between the rolls. Then by manipulating the handle 37, the proper pressure of the rolls on the blade is attained and the rolls are revolved to effect the operation. If another rolling operation is to take place at the side of and in a line parallel to the line of the last rolling operation, the gage-pin will be shifted in the gage-bar and the operation repeated.

By pivotally attaching one end of the gage-bar 30, the same may be moved on the ledge 29, and the gage-pin thereby be made to assume any gaging position between the outer and inner perforations, and the gaging will not be restricted to the distances between one and another of the perforations 32. By this construction of gage-bar any portion of a band-saw surface may be accurately positioned between the rolls.

Having described my invention what I claim and desire to secure by United States Letters Patent is,—

1. In a band-saw rolling machine, the combination with lower and upper rolls, of means for adjusting the rolls one with respect to the other and a gage device at one side of and operating in a plane between the rolls,—said gage device comprising a gage-bar and a movable gage device for engaging said gage-bar.

2. In a band-saw rolling machine, the combination with lower and upper rolls, of means for adjusting the rolls one with respect to the other; a gage-plate interposed in a plane between the rolls and a movable gage device on the gage-plate.

3. In a band-saw rolling machine, the combination with lower and upper rolls, of means for adjusting the rolls one with respect to the other; a pivoted gage-bar at one side of and operating in a plane between the rolls,—said bar having a series of perforations and a gage pin for engaging one perforation at a time in the gage-bar.

4. In a band-saw rolling machine, the combination with lower and upper rolls, of means for adjusting the rolls one with respect to the other; a gage-plate interposed in a plane between the rolls; a gage-bar pivoted to swing horizontally with respect to the gage-plate and a movable gage device for engaging the pivoted bar.

5. In a band-saw rolling machine, the combination with lower and upper rolls, of means for adjusting the rolls one with respect to the other; a gage-plate having a slot through which one of said rolls projects and said plate being interposed between the rolls, and a gage device on said gage-plate.

6. In a band-saw rolling machine, the combination with lower and upper rolls, of means for adjusting the rolls one with respect to the other; a gage-plate interposed between the rolls and having a slot through which one of said rolls projects; a gage-bar pivoted at one end with respect to the gage-plate and provided with a series of perforations, and a gage-pin for engaging one perforation at a time of the gage-bar.

7. In a band-saw rolling machine, the combination with a lower roll, of an upper roll; means for moving the upper roll toward and from the lower roll; a gage-plate over the lower roll and having a slot through which the upper portion of the circumference of the lower roll may project; a gage-bar whose upper surface is flush with the upper surface of the gage-plate and a gage device for engaging said gage-bar.

8. A gage-plate for band-saw rolling machines comprising a plate having a flat surface with a slot therein to receive a roll; a gage-bar on the gage-plate and a gage-device to engage the gage-bar.

In testimony whereof I affix my signature in the presence of two witnesses.

GEORGE S. TYLER.

Witnesses:
JEROME J. WALBLICH,
MAY H. WALLBILLICK.

Copies of this patent may be obtained for five cents each, by addressing the "Commissioner of Patents, Washington, D. C."